United States Patent [19]

Radko

[11] Patent Number: 5,687,392
[45] Date of Patent: Nov. 11, 1997

[54] SYSTEM FOR ALLOCATING BUFFER TO TRANSFER DATA WHEN USER BUFFER IS MAPPED TO PHYSICAL REGION THAT DOES NOT CONFORM TO PHYSICAL ADDRESSING LIMITATIONS OF CONTROLLER

[75] Inventor: Ron Radko, Bellevue, Wash.

[73] Assignee: Microsoft Corporation, Redmond, Wash.

[21] Appl. No.: 241,009

[22] Filed: May 11, 1994

[51] Int. Cl.[6] .................................................. G06F 15/02
[52] U.S. Cl. .................................................. 395/842
[58] Field of Search ........................... 395/821, 842, 395/843, 823, 824, 840, 846, 800, 822–825, 250

[56] References Cited

U.S. PATENT DOCUMENTS

| 4,722,051 | 1/1988 | Chattopadhya | 395/842 |
|---|---|---|---|
| 5,146,580 | 9/1992 | Naidu et al. | 395/402 |
| 5,161,215 | 11/1992 | Kouda et al. | 395/250 |
| 5,404,511 | 4/1995 | Notarianni | 395/601 |
| 5,497,476 | 3/1996 | Oldfield et al. | 395/439 |

FOREIGN PATENT DOCUMENTS 23266  2/1981  European Pat. Off. .

OTHER PUBLICATIONS

*IBM Technical Reference, Personal Computer AT* System BIOS 5, ROM BIOS Code Listing for Floppy Controller, IBM, 1985, pp. 97–115.
"DMA revealed", by Hazzah, Karen, Apr., 1992, Windows–DOS Developer's Journal, v3, n4, p5(14).
"DMA Controller programming in C", by Watson, Robert, Nov., 1993 C users Journal, v11, n11, p35(15).
"implementing direct memory access (DMA) in C", by Bradley, Don, May, 1992, C Users Journal, v10, n5, p53 (18).

*Primary Examiner*—Moustafa M. Meky
*Attorney, Agent, or Firm*—Seee and Berry LLP

[57] ABSTRACT

The present invention is a method and apparatus for efficiently transferring data between an input/output device and a main memory area of a computer system. More specifically, the invention transfers a requested amount of data using direct memory access and either a single transfer buffer or a dynamically allocated transfer buffer. The invention receives input/output requests that specify an amount of data to be transferred between the input/output device and a logical user buffer contained within the main memory area. By evaluating physical memory locations that correspond to the logical user buffer, the invention determines whether the physical memory locations conform to addressing limitations of a direct memory access transfer buffer. When the physical memory locations conform to the addressing limitations of a direct memory transfer buffer, the invention transfers the requested data directly between the input/output device and the physical memory locations of the logical user buffer. On the other hand, when the evaluated physical memory locations do not conform to the physical requirements of a direct memory access transfer buffer, the invention dynamically allocates a conforming direct memory access transfer buffer. Subsequently, the invention transfers the requested data between the input/output device and the conforming buffer. After transferring the data between the conforming buffer and the input/output device, the invention releases the allocated buffer to reduce the amount of memory overhead in the computer system.

15 Claims, 7 Drawing Sheets

5,687,392

SYSTEM FOR ALLOCATING BUFFER TO TRANSFER DATA WHEN USER BUFFER IS MAPPED TO PHYSICAL REGION THAT DOES NOT CONFORM TO PHYSICAL ADDRESSING LIMITATIONS OF CONTROLLER

TECHNICAL FIELD

This invention relates generally to a method and apparatus for transferring data between storage areas of a computer system, and more specifically, to a method and apparatus which transfers the data via direct memory access.

BACKGROUND OF THE INVENTION

In computer systems, it is often necessary to transfer large blocks of data between two areas of data storage. In order to facilitate such data transfer, conventional computer systems use a process known as direct memory access (DMA) transfer. In brief, DMA transfer describes a process in which a computer system transfers information directly between an input/output device (e.g., a disk drive) and a memory rather than taking the longer and more circuitous route of transferring data from the input/output device to central processing unit, and then from the central processing unit to memory. The device which transfers data directly between the input/output device is known as a DMA controller. As can be inferred from above, the use of a DMA controller improves data transfer time by eliminating an amount of processing-time overhead from the central processing unit. These components and their interaction will be explained in more detail below with reference to FIG. 1.

FIG. 1 illustrates a conventional computer system performing a DMA transfer. The illustrated computer system 100 contains a DMA controller 110, a secondary storage device 120, a main memory 130, a central processing unit 140, and a system bus 150 for connecting the previously described components. Additionally, the main memory 130 is illustrated as having both a logical address space 133 and a physical address space 134. As will be explained in more detail below, each of two address spaces is used to access particular locations of the main memory area 130. As a brief introduction, an application program 131 typically accesses locations of the main memory area using logical addresses contained within the logical address space. On the other hand, low level software components, as well as hardware devices (e.g. the DMA controller 110), access locations of the main memory using physical addresses contained within the physical address space. In order to allow application programs to interface with the above-mentioned low level software components and hardware devices, conventional computer systems provide an operating system memory management component 136 which, in conjunction with the central processing unit, translates logical addresses into physical addresses. This translation process is described in more detail below. Having described the fundamental components of the computer system 100, the DMA transfer process will now be described generally.

The DMA controller 110 transfers data directly between the secondary storage device 120 and the main memory 130. The DMA transfer process begins when the secondary storage device issues a DMA transfer request to the DMA controller. As will be explained in more detail below, a DMA transfer request informs the DMA controller to transfer a specified amount of data between the main memory and the secondary storage device. In response to this request, the DMA controller sends a bus request to the central processing unit 140. This bus request informs the central processing unit that the DMA controller needs control of the system bus 150. In brief, the system bus is a set of hard wired lines, or wires, used for data transfer among the components of the computer system 100. In most situations, the central processing unit controls the system bus. However, in response to the bus request, the central processing unit issues a bus grant signal which relinquishes control of the system bus to the DMA controller. Once the central processing unit has relinquished its control of the system bus, the DMA controller processes the DMA transfer request.

Generally, a DMA transfer request provides the DMA controller 110 with the three parameters illustrated in FIG. 2A: (1) a block size 210 for indicating the amount of data to be transferred, (2) a source address 220 for indicating a starting address to copy the block of data from, and (3) a destination address 230 for indicating a starting address to copy the block of data to. After providing the DMA controller with these three parameters, the DMA controller transfers the data of specified block size between the source address and the destination address. More specifically, the DMA controller consecutively transfers a number of consecutive datum (the number being defined by the specified block size) between the source address and the destination address. Having described the format and nature of a DMA transfer request generally, the DMA transfer process will now be described as the process occurs between an application program 131 and the secondary storage device 120.

As explained above, higher level programs, such as application programs 131, access memory locations of the main memory 130 using logical addresses of the logical address space 133. These logical addresses represent the main memory area from a conceptual standpoint without reference to the actual physical memory locations contained within the physical address space 134. The purpose of the logical address space is to allow higher level programs to access the main memory in a simplified manner. For example, an application program 131 may treat an application buffer 132 as a single contiguous block of logical memory, when, in reality, the application buffer is mapped to more than one physical memory region 135.

In contrast to the application program, the DMA controller 110 accesses memory locations of the main memory 130 using only the physical addresses of the physical address space 134. Therefore, when conducting DMA transfer, the DMA controller copies requested data between the secondary storage device 120 and the physical address space 134. More specifically, DMA controllers of conventional computer systems conduct DMA transfer by copying the specified block of data 210 between the secondary storage device 120 and the a DMA transfer buffer 137. In conventional systems, this DMA transfer buffer is a permanently allocated buffer contained within the physical address space. As will be explained in detail below, this DMA transfer buffer is subject to several physical constraints.

A first physical restraint placed upon the DMA transfer buffer 137 is that it must be positioned at a location of physical memory that the DMA controller 110 can access. The DMA controller accesses the physical address space 134 via an input/output bus 115. In brief, this input/output bus is similar to the system bus 150 in that both buses provide pathways that interconnect the DMA controller, the secondary storage device 120, the main memory 130, and the central processing unit 140. However, the input/output bus can differ from the system bus in terms of addressing capability. As mentioned above, a bus is a series of hardwire connections or wires used to transfer data between the components of the computer system 100. Each address line of a bus 115, 150 transmits a single bit of data. A bit, short for binary digit, exists in one of two states (e.g., 0 or 1). Consequently, when each address line of a bus transmits a bit of data in unison, the bus can address $2^n$ memory locations, where n represents the number of address lines of the bus. However, the input/output bus of a typical DMA controller can be significantly smaller than the system bus of the computer system. As a result, the DMA controller cannot access all of the physical memory locations that the system bus can access. For example, while the current standard system bus of most personal computers consists of 32 address lines, the standard input/output bus of a typical floppy disk DMA controller consists of only 24 address lines. Consequently, while the computer system can access $2^{32}$ or 4 gigabytes of the physical address space, the typical floppy disk DMA controller can only access $2^{24}$ or 16 megabytes of the physical address space. The address above which a DMA controller cannot access is referred to as the maximum accessible address.

A second physical constraint of the DMA transfer buffer 137 is that it cannot cross a segment boundary. As will be explained in more detail below, a segment boundary is a logical partition of the physical address space. Such a logical partition exists in computer systems which employ a segmented addressing system. FIG. 2B illustrates an overview of such a segmented addressing system. In brief, a segmented addressing system provides a method of logically addressing the physical memory locations of the physical address space 134. This logical addressing method allows programs (e.g., application programs 131) to use a single logical address, formed by a segment:offset pair 240, to refer to a particular piece of data. The advantage of such a segmented addressing system is that the segment:offset pair remains constant even if the physical location of the particular piece of data changes location in the physical address space.

The restriction that a DMA transfer buffer 137 cannot cross a segment boundary arises because, in a computer system that utilizes segmented addressing, the secondary storage device 120 communicates the source and destination addresses to the DMA controller 110 as a segment:offset pair 240. Upon receipt of these segment:offset pairs, the DMA controller translates the segment:offset pairs into physical addresses. This translation process begins by locating a physical base address 250 of the segment 245. The physical base address is located through the use of a segment descriptor table 246. Each entry 247 of the segment descriptor table provides a physical base address for a respective segment. As the name implies, the physical base address is an address contained within the physical address space 134. Having discerned the physical base address for the segment 245, the DMA controller determines a physical source or destination address 257 by adding an offset 255 to the physical base address. Whether this physical address is a physical source address or a physical destination address depends on the direction of data transfer (e.g., when data is being transferred from the secondary storage device to the main memory, the physical address in the main memory is a physical destination address). As illustrated, the physical base address and a maximum value of the offset define the segment boundaries for a segment. After determining the physical source and destination addresses, the DMA controller sequentially transfers the requested data between the determined physical source and destination addresses. However, the physical base address of a particular segment is not fixed. On the contrary, the data of the particular segment may be moved by the operating system memory management component 136 at any time. Thus, the segment 245 and the physical base address do not bear a linear relationship to each other. Therefore, the physical base address for a segment (n) is not likely to be positioned immediately after an ending segment boundary 259 of a segment (n-1). As a result, the DMA controller 110 cannot transfer data across the boundaries 259 of any given segment.

To illustrate the above discussion by way of example, assume that the DMA controller has an input/output bus 115 formed by 24 address lines. In this scenario, the DMA controller utilizes the eight uppermost address lines ($A_{23}$-$A_{16}$) to select one of 256 possible segments. In accordance with the above discussion, the DMA controller utilizes the remaining 16 low order address lines ($A_{15}$-$A_0$) to specify the offset for the selected segment. As a result, each segment is limited to 64-kilobytes. Thus, the DMA controller of this example cannot transfer data across a 64-kilobyte boundary, the boundary being relative to the physical base address of the segment.

To overcome the above-described limitations of the DMA transfer buffer 137, conventional computer systems perform DMA transfer by permanently allocating the DMA transfer buffer beneath the maximum addressable memory location or the DMA controller. When conducting DMA transfer, these computer systems program the DMA controller to transfer the desired block of data between the secondary storage device 120 and the permanently allocated DMA transfer buffer. Once the DMA controller has completed transferring the specified block of data, it issues a DMA complete signal to the central processing unit 140. Having received the DMA complete signal, the central processing unit recaptures control of the system bus 150. Once the central processing unit recaptures control of the system bus 150, conventional computer systems copy the data between the DMA transfer buffer 137 and the physical memory regions 135 that map to the application buffer 132. This conventional method of conducting DMA transfer is known as double buffering and is wasteful both in terms of memory system overhead and processing time.

SUMMARY OF THE INVENTION

The preferred embodiment of the present invention is directed towards a facility which efficiently transfers data between an input/output device and a main memory area of a computer system. More specifically, the facility transfers a requested amount of data using direct memory access and either a single transfer buffer or a dynamically allocated transfer buffer. The facility receives a memory access request that specifies an amount of data to be transferred between a logical user buffer contained in the main memory area and the input/output device. Upon receipt of the memory access request, the facility evaluates the physical memory locations that the logical user buffer is mapped to. When the physical memory locations conform to physical requirements of a direct memory access transfer buffer, the facility transfers the data directly between the input/output device and the physical memory locations of the logical user buffer. On the other hand, when the physical memory locations do not conform to the physical requirements of a direct memory access transfer buffer, the facility dynamically allocates a conforming direct memory access transfer buffer. Subsequently, the data is transferred between the input/output device and the direct memory access transfer buffer. After transferring the data between the dynamically allocated direct memory access transfer buffer and the input/output device, the facility releases the allocated buffer to reduce the amount of memory overhead in the computer system.

DETAILED DESCRIPTION OF THE INVENTION

The preferred embodiment of the present invention is a method and apparatus for efficiently transferring data between an input/output device and a main memory area of a computer system. More specifically, the preferred embodiment transfers a requested amount of data using DMA and either a single transfer buffer or a dynamically allocated transfer buffer. In the preferred embodiment, code for practicing the present invention is found in an input/output device driver which receives memory access requests from an application program. These received memory access requests specify an amount of data that should be transferred between a logical user buffer contained in the main memory area and the input/output device. Upon receipt of the memory access request, the input/output device driver evaluates the physical memory locations to which the logical user buffer is mapped. When the physical memory locations conform to physical requirements of a direct memory access transfer buffer, the preferred embodiment of the present invention transfers the requested data directly between the input/output device and the physical memory locations of the logical user buffer. On the other hand, when the physical locations do not conform to the physical requirements of a direct memory access transfer buffer, the preferred embodiment of the present invention dynamically allocates a conforming direct memory access transfer buffer. When the application program has requested to output data, the input/output device driver consolidates the output data in a buffer suitable for DMA transfer by copying the data from the physical locations of the user buffer to the dynamically allocated transfer buffer. The preferred embodiment then transfers the data between the input/output device and the direct memory access buffer. When the application program has requested to input the data, the input/output device driver copies the transferred data from the dynamically allocated transfer buffer to the physical locations of the user buffer. Subsequently, the preferred embodiment releases the allocated buffer to reduce the amount of memory overhead in the computer system.

The preferred embodiment of the present invention will now be described in detail with reference to FIGS. 3–7.

Figure 1:
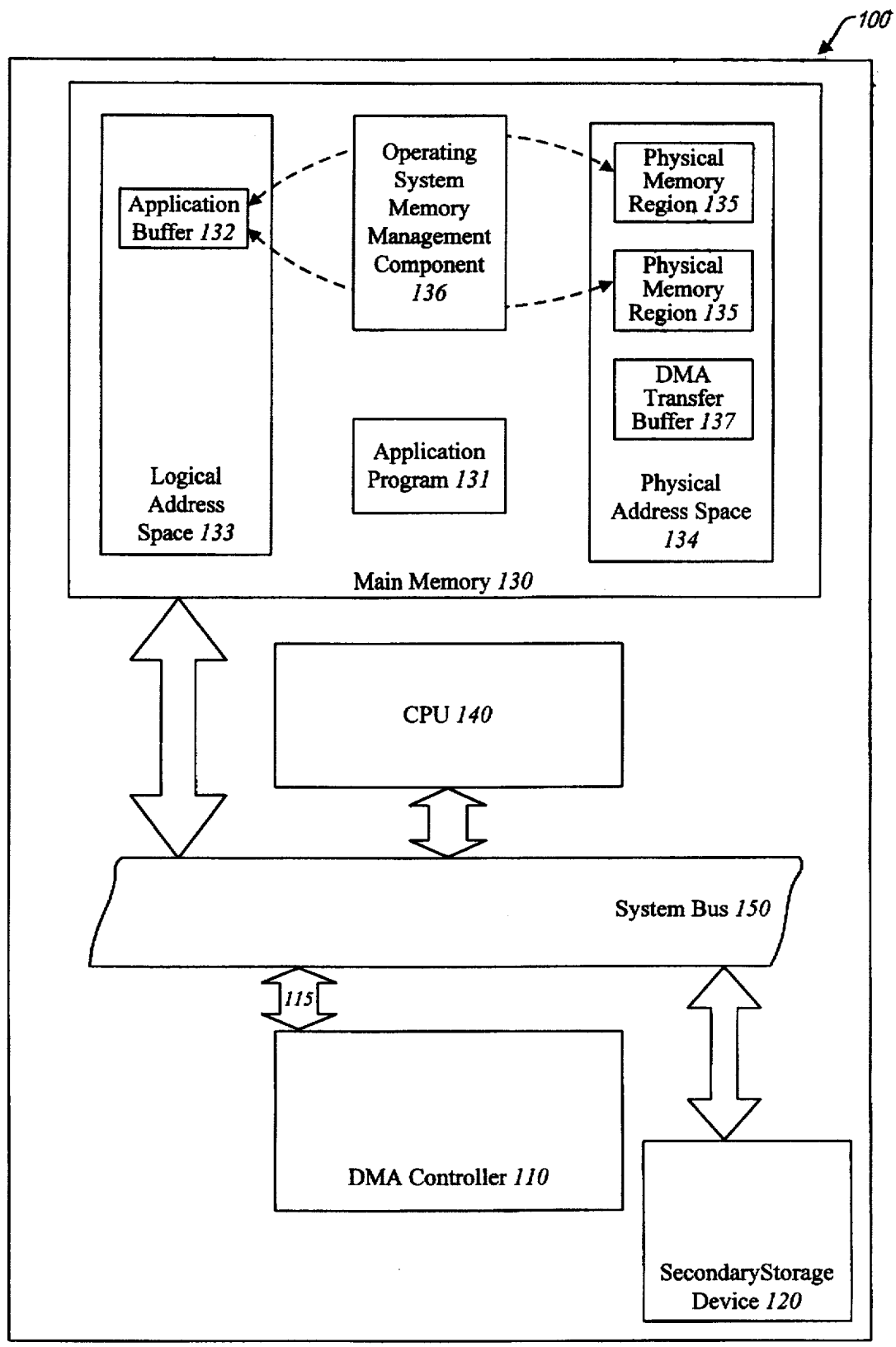
FIG. 1 illustrates a conventional computer system performing a direct memory access data transfer.
Figure 2A:
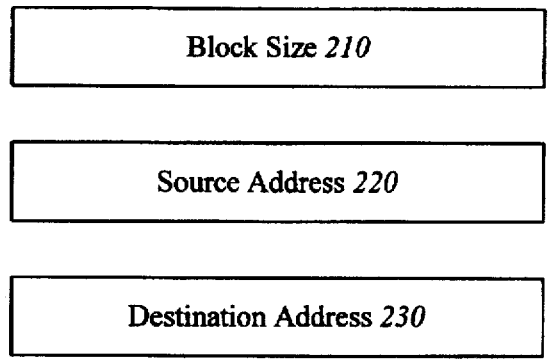
FIG. 2A illustrates the parameters of a conventional direct memory transfer request.
Figure 2B:
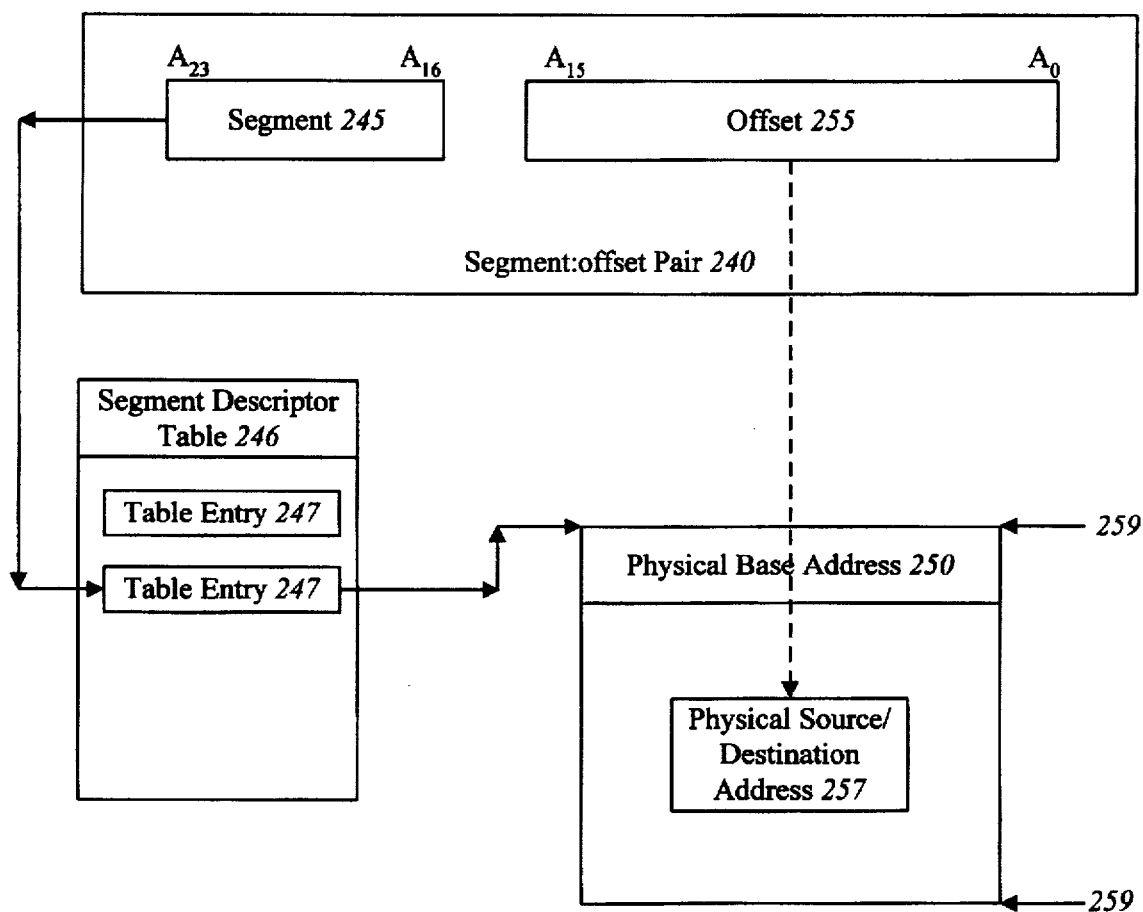
FIG. 2B illustrates an overview of a conventional segmented addressing system.

Additionally, the detailed discussion which follows makes cursory references to FIG. 2A and FIG. 2B. While these figures were discussed with reference to the background of the invention, those skilled in the art will appreciate that the direct memory transfer request parameters of FIG. 2A and the segmented addressing system of FIG. 2B are applicable to the novel concepts of the present invention.

Figure 3:
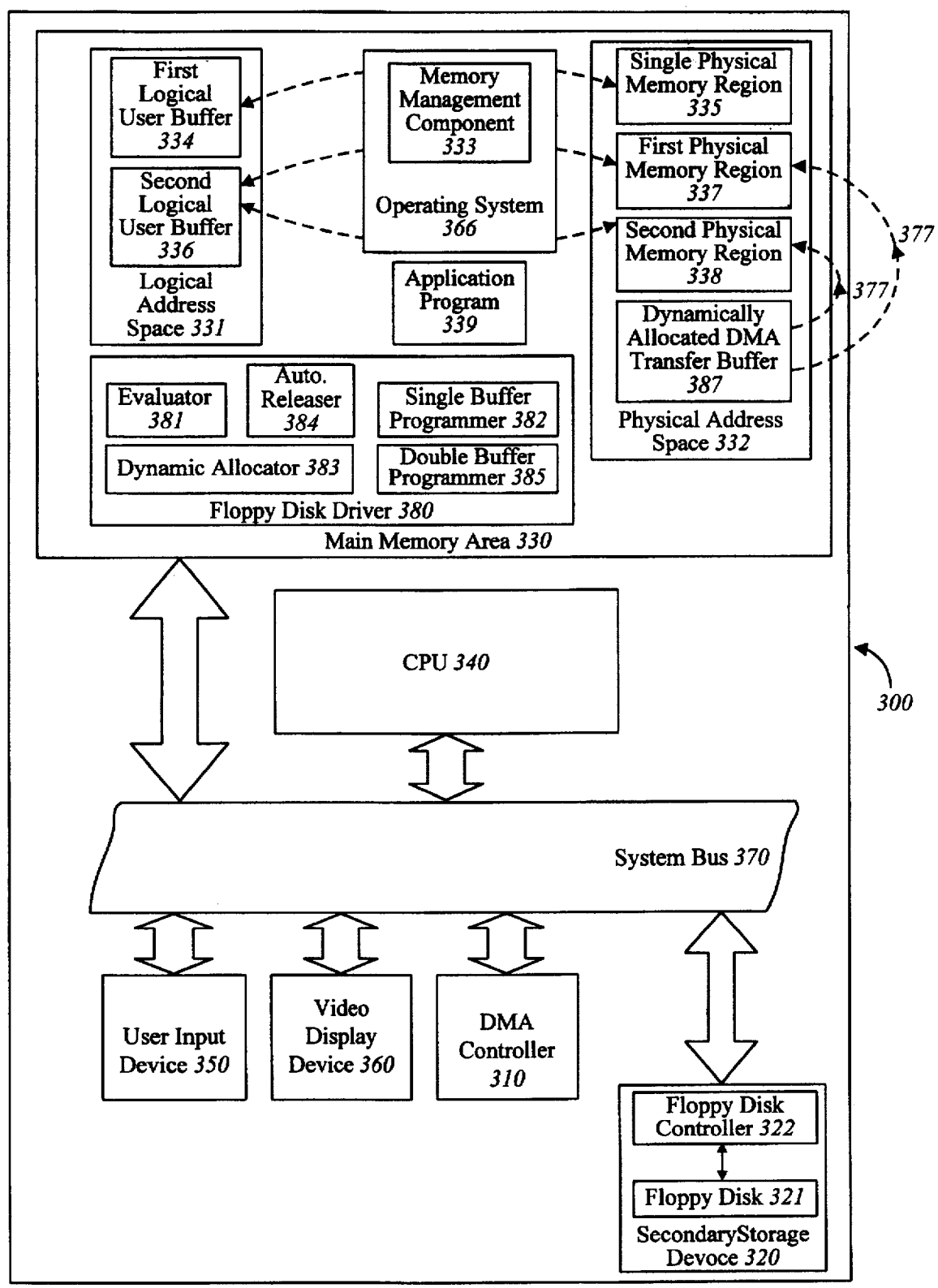
FIG. 3 illustrates a computer system suitable for practicing the preferred embodiment of the present invention.

FIG. 3 illustrates a computer system suitable for practicing the preferred embodiment of the present invention. The computer system 300 has a DMA controller 310, a secondary storage device 320, a main memory area 330, a central processing unit 340, a user input device 350, and a video display device 360. The above listed components are interconnected via a system bus 370. An operating system 366 is contained within the main memory area for controlling the usage of the above-identified hardware components (310, 320, 330, 340, 350, and 360). Additionally, the main memory area is shown as being addressable as either a logical address space 331 or as a physical address space 332. In order to aid in the addressing of these address spaces, the operating system provides a memory management component 333 to map logical addresses of the logical address space to physical addresses of the physical address space. For purposes of example, the memory management component is shown as mapping a first logical user buffer 334 to a single contiguous physical memory region 335 in the physical address space. Similarly, the memory management component maps a second logical user buffer 336 to a first contiguous physical memory region 337 and a second contiguous physical memory region 338. Additionally, the physical address space is also shown as having a dynamically allocated DMA buffer 387. The allocation and use of this buffer will be described below.

As illustrated, the secondary storage device 320 is a floppy disk drive which uses a floppy disk controller 322 to access a floppy disk 321 contained within the floppy disk drive 320. In order for an application program 339 to access the floppy disk, the computer system 300 provides a floppy disk driver 380 in the main memory area 330. A primary purpose of the floppy disk driver is to receive and process data floppy disk transfer requests from an application program. In brief, the floppy disk driver processes data transfer requests by programming the DMA controller 310 to transfer data between the floppy disk and a contiguous physical memory region (e.g., 335) contained within the physical address space 332.

In the preferred embodiment of the present invention, the floppy disk driver 380 contains: (1) an evaluator 381 for evaluating a logical user buffer to determine whether it conforms to a DMA transfer buffer, (2) a dynamic allocator 383 for allocating a direct memory access transfer buffer, (3) an automatic releaser 384 for dynamically deallocating the dynamically allocated DMA transfer buffer 387, (4) a single buffer programmer 382 for programming the DMA controller 310 to transfer requested data directly between a physical memory region of a logical user buffer (e.g., 335) and the floppy disk 321, and (5) a double buffer programmer 385 for (a) programming the DMA controller to transfer requested data between the floppy disk and the dynamically allocated DMA transfer buffer and for (b) copying the requested data between physical memory regions 337, 338 and the dynamically allocated DMA transfer buffer. The interaction of these components will be described in greater detail below with reference to FIGS. 4–7.

The detailed discussion which follows refers frequently to DMA transfer buffers. As previously explained, a DMA transfer buffer is a region of physical memory that conforms to the one or more physical requirements that are dictated by the addressing limitations of the particular DMA controller 310 employed in the computer system 300. For purposes of example, the discussion which follows assumes that the DMA controller requires that the DMA transfer buffer be contained within a single contiguous physical memory region that is positioned below the controller's maximum accessible address. Additionally, the discussion further assumes that the DMA transfer buffer cannot cross a segment boundary. However, those skilled in the art will appreciate that a DMA controller 310 can impose either fewer or greater restrictions upon the requirements for a DMA transfer buffer. For example, in computer systems using a flat memory architecture (an architecture that does not address the physical memory locations using the previously described segment:offset pairings of FIG. 2B), a DMA transfer buffer is defined as a single contiguous physical memory region that is positioned below the maximum accessible address 398.

Figure 4:
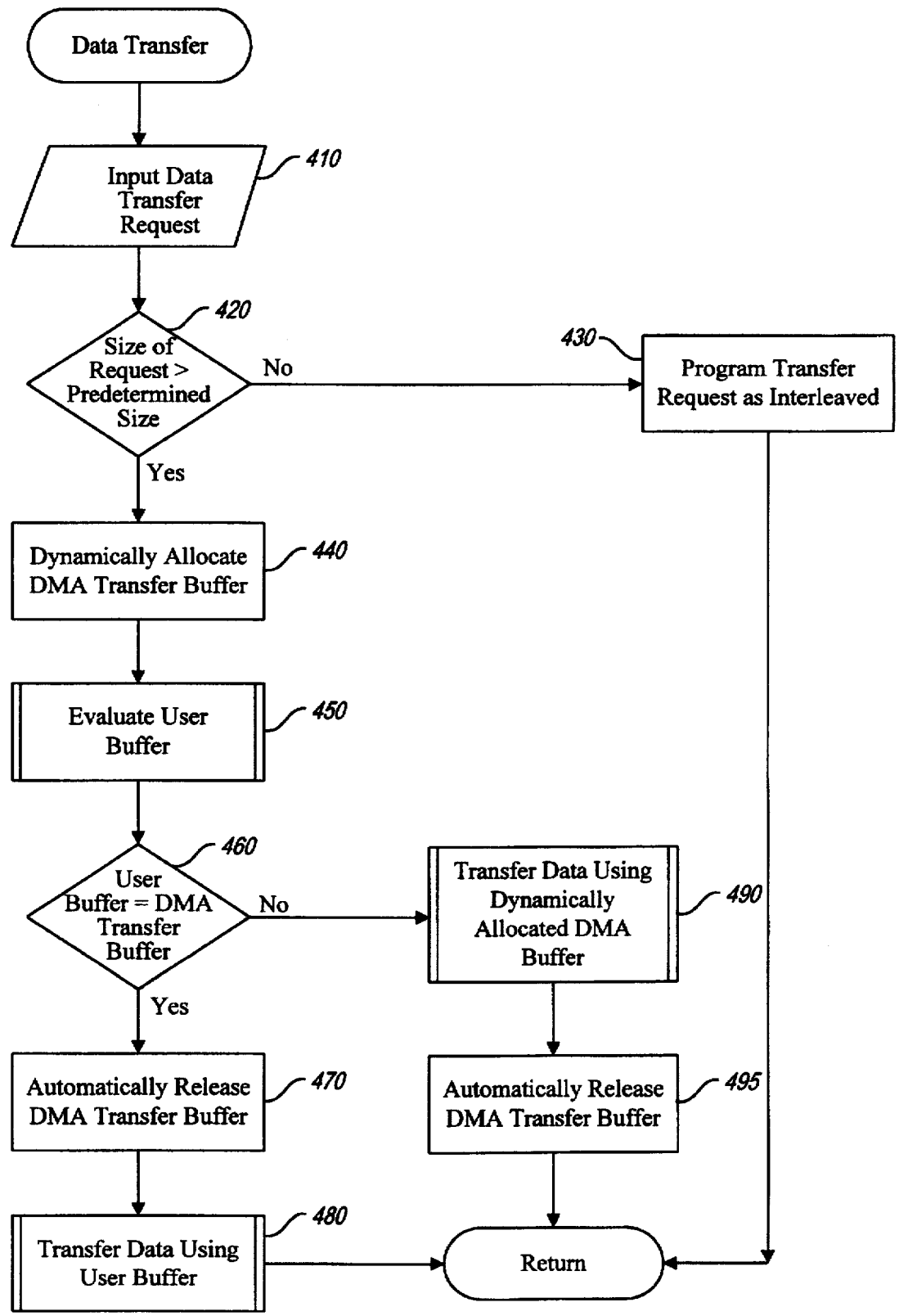
FIG. 4 is a flow diagram illustrating the processing steps for transferring data in the preferred embodiment of the present invention.

FIG. 4 is a flow diagram illustrating the processing steps for transferring data in the preferred embodiment of the present invention. The preferred embodiment of the present invention begins processing by inputting a data transfer request from an application program (step 410). Typically, an application program relays a data transfer request to the floppy disk driver by specifying an amount of data to be transferred (i.e., via block size 210 of FIG. 2A), between a logical user buffer and the floppy disk.

After inputting the data transfer request, the previously described evaluator 381 determines when the requested amount of data transfer (e.g., the size of the user buffer 334, 336 that defines the data transfer request) is of sufficient size to program the data transfer request as a DMA block transfer (step 420). More specifically, by comparing the size of the user buffer with a heuristically predetermined block size, the evaluator determines when it is cost effective, in terms of processing time and programming overhead, to process a data transfer request as a DMA block transfer. Typically, the absolute value of the predetermined block size is dependent on the access times of the storage areas involved in the data transfer. When the evaluator determines that the user buffer is not of a sufficient size to warrant a DMA block transfer, the preferred embodiment of the present invention programs the requested data transfer by interleaving the central processing unit 340 and the DMA controller 310 (step 430). More specifically, the preferred embodiment of the present invention alternates the transferring process of each consecutive datum. For example, the preferred embodiment of the present invention transfers a first byte of data using the central processing unit, and, while waiting for the central processing unit to complete this transfer request, the preferred embodiment of the present invention programs a second byte of data to be transferred using the DMA controller. By interleaving the transfer of data in this fashion, the preferred embodiment of the present invention reduces the amount of time necessary to complete the data transfer.

Alternatively, when the evaluator 381 determines that the user buffer is of a suitable size for DMA block transfer, the dynamic allocator 383 dynamically allocates a DMA transfer buffer 387 (step 440). After dynamically allocating the DMA transfer buffer, the preferred embodiment determines when the user buffer conforms with the physical requirements of a DMA transfer buffer (step 450).

Figure 5:
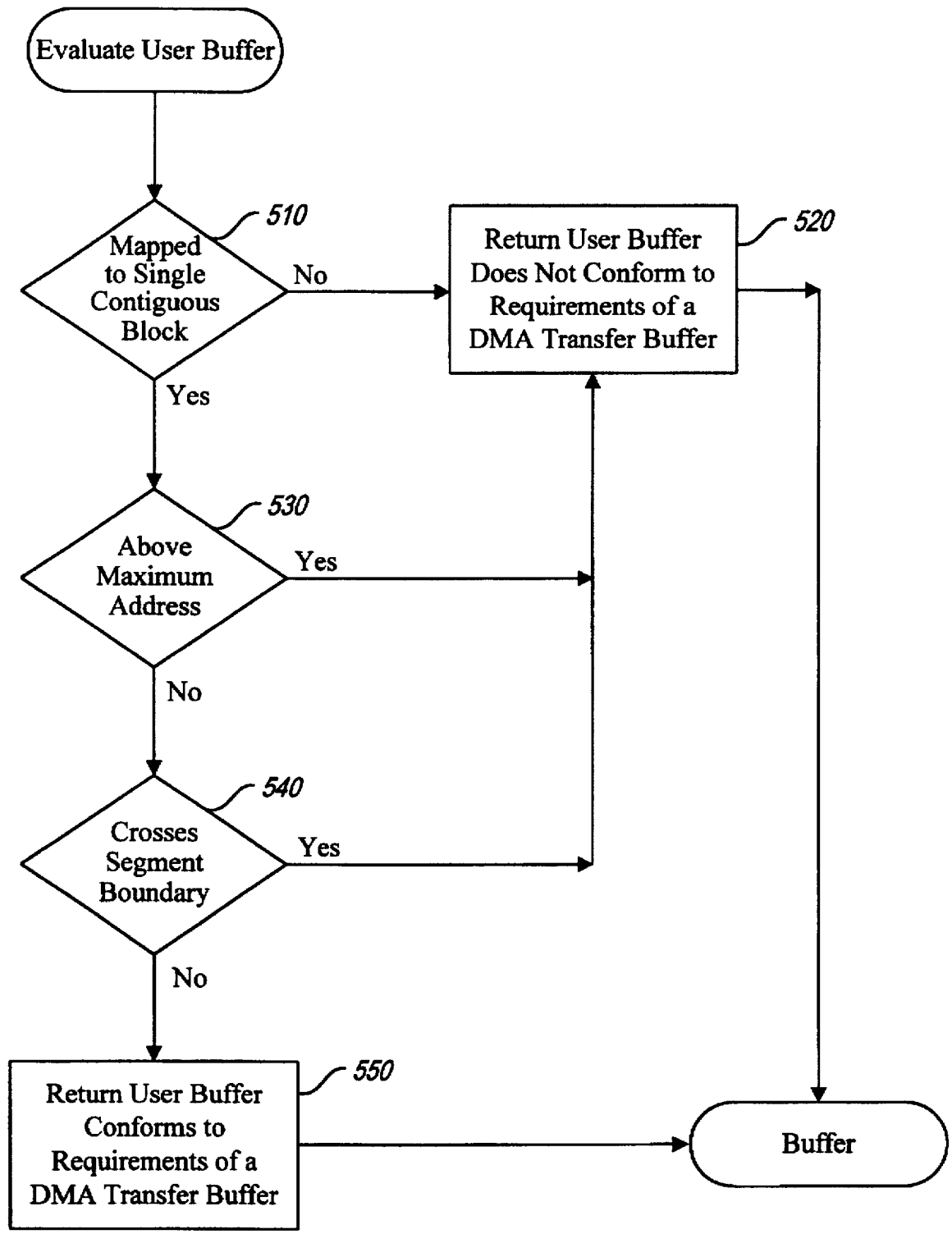
FIG. 5 is a flow diagram illustrating the processing steps for evaluating a user buffer in the preferred embodiment of the present invention.

FIG. 5 is a flow diagram illustrating the processing steps for evaluating a user buffer in the preferred embodiment of the present invention. In the preferred embodiment of the present invention, the evaluator 381 performs the processing steps of FIG. 5. The evaluator begins by determining whether the user buffer is mapped to a contiguous physical region of block (step 510). This step is performed by determining whether the logical addresses of the user buffer are mapped to consecutive physical memory addresses. For example, the logical addresses of the first logical user buffer 334 are mapped to consecutive physical memory addresses of the contiguous physical memory region 335. In contrast, the logical addresses of the second logical user buffer 336 are not mapped to consecutive physical memory addresses of the physical address space 332. Instead, the second logical user buffer is divided into two separate physically contiguous memory regions 337, 338. Under these conditions, the preferred embodiment returns a flag which indicates that the second logical user buffer does not conform to the requirements of a DMA transfer buffer (step 520). However, as the first logical user buffer 334 is mapped to a single contiguous physical block, the evaluator continues its examination of the first logical user buffer to determine whether it is positioned beneath the maximum accessible address of the DMA controller 310 (step 530). For purposes of example, assume that the first logical user buffer is mapped to physical memory locations that are positioned beneath the maximum accessible address of the DMA controller 310. In this case, the evaluator continues processing by discerning whether the first logical user buffer is mapped to physical memory locations that cross a segment boundary (step 540). Again, for purposes of example, assume that these memory locations do not cross a segment boundary. In this case, the evaluator 381 returns an indicator which specifies that the physical memory locations of the first logical user buffer conform to the requirements of a DMA transfer buffer (step 550).

The preferred embodiment continues by examining the results returned by the evaluator 381 (step 460). More specifically, the preferred embodiment determines that the evaluator 381 has identified the first logical user buffer 334 as one which conforms with the requirements of a DMA transfer buffer. Consequently, the automatic releaser 384 deallocates the previously allocated DMA transfer buffer 387 (step 470). By deallocating, or releasing, the buffer in this fashion, the present invention maximizes an amount of available memory in the physical address space 332. In the preferred embodiment of the present invention, the automatic releaser 384 automatically deallocates the transfer buffer 387 when the buffer has not been accessed within a predetermined amount of time. More specifically, the buffer is automatically deallocated when it has not been accessed within two seconds of its allocation. However, those skilled in the art will appreciate that the optimum value for this predetermined amount of time varies considerably depending on the particular secondary storage device employed in the computer system. For example, this predetermined amount of time would be significantly less in a computer system which employed a hard drive as the secondary storage device as opposed to a floppy disk drive. Having released the dynamically allocated DMA transfer buffer, the preferred embodiment transfers the requested data between the secondary storage device and the contiguous physical memory region 335 that corresponds to the first logical user buffer (step 480).

Figure 6:
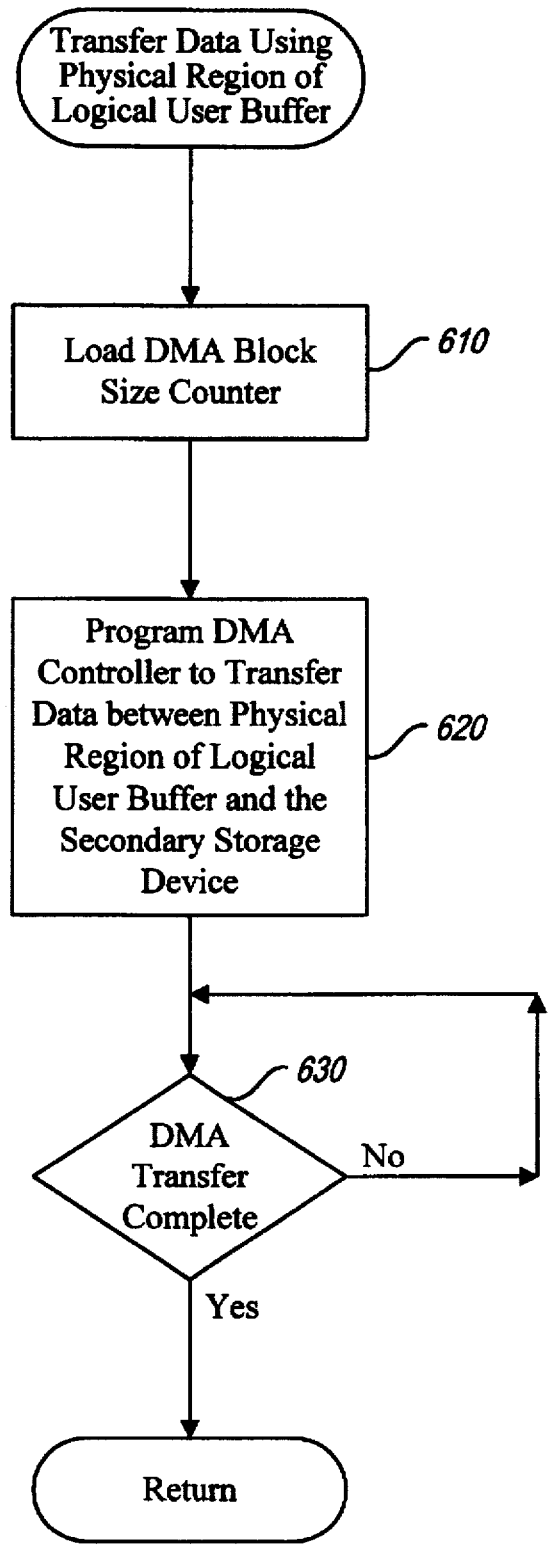
FIG. 6 is a flow diagram illustrating the processing steps for transferring data using the user buffer as a direct memory access transfer buffer in the preferred embodiment of the present invention.

FIG. 6 is a flow diagram illustrating the processing steps for transferring data directly between the physical memory region of a user buffer and the secondary storage device 320. In the preferred embodiment, these steps are performed by the single buffer programmer 382. The single buffer programmer begins by loading a transfer block size counter of the DMA controller 310 with the block transfer size information provided via the transfer request of the application program (step 610). This transfer block size counter indicates the amount of data that the DMA controller will sequentially transfer between the main memory area 330 and the secondary storage device 220. The single buffer programmer then programs the DMA controller to transfer the requested data directly between the contiguous physical memory region 335 that corresponds to the first logical buffer 334 and the secondary storage device (step 620). In brief, this step is performed by providing the DMA controller with a starting address of the contiguous physical memory region 335 and a starting physical address for the corresponding memory locations of the secondary storage device 320. After providing these addresses, the DMA controller directly transfers the requested data from the secondary storage device to the physical memory locations that map to the first logical user buffer (step 630). In the above-described manner, the present invention conducts DMA data transfer without employing the costly double buffering process of the prior art. Having described the data transfer process using the single buffer programmer, the data transfer process using the double buffer programmer 385 will now be described.

As explained with reference to FIG. 5, the evaluator 381 determined that the second logical user buffer 336 is not mapped to a physical memory region that conforms to the requirements of a DMA transfer buffer (steps 510 and 520). Consequently, the DMA controller 310 cannot directly transfer the requested data between the secondary storage device 320 and the physical memory regions 337, 338 that correspond to the second logical user buffer. However, by transferring the requested data using the dynamically allocated DMA transfer buffer 387, the present invention transfers this data in a manner that minimizes the amount of memory overhead imposed upon the computer system (steps 460 and 490).

Figure 7:
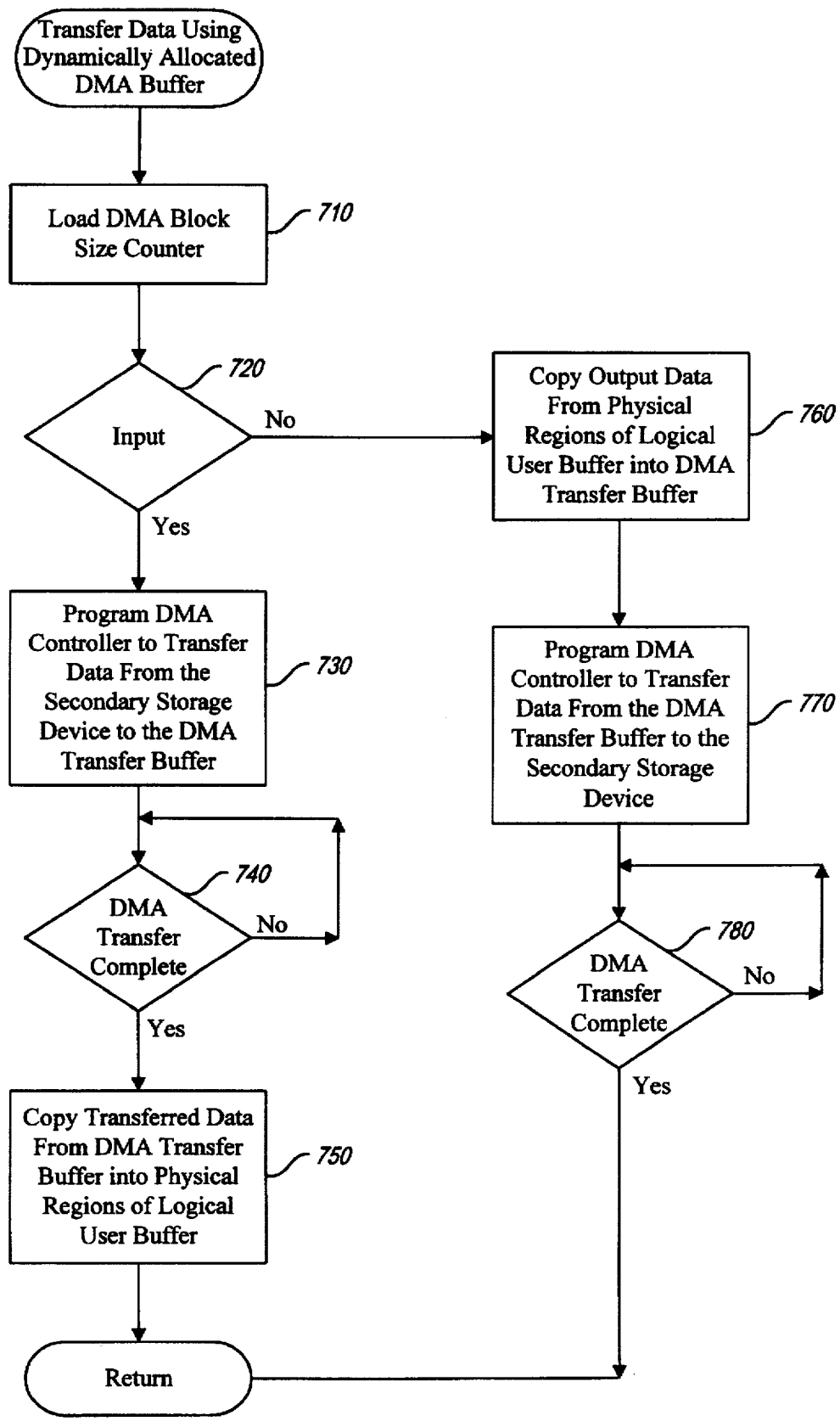
FIG. 7 is a flow diagram illustrating the processing steps for transferring data using a dynamically allocated direct memory access transfer buffer in the preferred embodiment of the present invention.

FIG. 7 is a flow diagram of the processing steps for transferring data using the dynamically allocated DMA transfer buffer 387. In the preferred embodiment, the double buffer programmer 385 performs these processing steps. The double buffer programmer first loads the transfer block size counter of the DMA controller 310 with the size of the received memory transfer request (step 710). Subsequently, the double buffer programmer determines whether the application program has requested to input or to output data (step 720). When the application program has requested to input data (i.e., to transfer data from the floppy disk 321 to the second logical user buffer 336), the double buffer programmer 385 programs the DMA controller to transfer data from the floppy disk to the dynamically allocated DMA transfer buffer (step 730). When the DMA controller has completed the transfer, the double buffer programmer copies the transfer data from the dynamically allocated DMA buffer to the first and second contiguous physical memory regions 337 and 338 which map to the second logical user buffer 336 (steps 740 and 750). Conceptually, this copying is illustrated by the dotted arrows 377. Once the double buffer programmer has copied the data, the present invention automatically releases the dynamically allocated DMA transfer buffer 387 (step 495).

To output data from the second logical user buffer 336 to the floppy disk 321, the present invention performs the logical reverse of the steps required to input data into the second logical user buffer. More specifically, the double buffer programmer 385 first copies the output data into the dynamically allocated DMA transfer buffer 387. After copying the data, the present invention programs the DMA controller 310 to transfer the data from the dynamically allocated DMA transfer buffer to the floppy disk (steps 760 and 770). When the programmed transfer is complete, the preferred embodiment automatically releases the dynamically allocated DMA transfer buffer from the physical address space 332 (steps 780 and 495).

By releasing the dynamically allocated DMA transfer buffer in the above-described manner (step 495), the preferred embodiment of the present invention increases the amount of physical memory which is available to the computer system 300. Thus, the preferred embodiment of the present invention greatly reduces the amount of memory overhead which has traditionally been associated with DMA transfer in conventional systems.

The preferred embodiment of the present invention is a method and apparatus for conducting DMA transfer between a floppy disk and a main memory area. As such, the preferred embodiment of the present invention has been described in its embodiment of a floppy disk driver. However, those skilled in the art will appreciate that the inventive concepts disclosed within are not limited to a floppy disk driver or to any particular data storage device. For example, the inventive concepts of the preferred embodiment are equally applicable to transferring data between a hard disk and a main memory area. Accordingly, the present invention is not limited by the above description of the preferred embodiment, but instead, is limited only by the scope of the appended claims.

I claim:

1. In a computer system having a memory area, a secondary storage area, and a direct memory access controller for transferring data between the secondary storage area and the memory area, a method for processing a memory transfer request from an application program that specifies an amount of data and a user buffer, the user buffer being mapped to a physical memory region of the memory area and being used to hold transferred data for the application program, the method comprising the computer-implemented steps of:

determining physical addressing limitations of the direct memory access controller;

determining when the user buffer is mapped to a physical memory region of said memory area that conforms to the physical addressing limitations of the direct memory access controller;

when the user buffer is mapped to a physical memory region of said memory area that conforms to the physical addressing limitations of the direct memory access controller, transferring the specified amount of data between the physical memory region and the secondary storage area via the direct memory access controller; and when the user buffer is mapped to a physical memory region of said memory area that does not conform to the physical addressing limitations of the direct memory access controller, allocating a conforming buffer in the memory area for use in transferring the specified amount of data, the conforming buffer being a buffer which conforms to the physical addressing limitations of the direct memory access controller.

2. The method of claim 1, wherein the step of allocating includes deallocating the conforming buffer, when, after a predetermined amount of time, the conforming buffer has not been used to transfer the specified amount of data.

3. The method of claim 2, further comprising the steps of:

determining when the user buffer is not mapped to a physical memory region that conforms to the physical addressing limitations of the direct memory access controller; and when the user buffer is not mapped to a physical memory region that conforms to the physical addressing limitations of the direct memory access controller, transferring the specified amount of data between the allocated conforming buffer and the secondary storage area via the direct memory access controller.

4. The method of claim 1, wherein the memory area is formed by a plurality of partitions, each partition having an upper boundary and a lower boundary, and wherein the step of determining when the user buffer is mapped to a physical memory region that conforms to the physical addressing limitations of the direct memory access controller, comprises the steps of:

determining when the user buffer is mapped to a physical memory region that crosses one of the boundaries of one of the plurality of partitions; and when the user buffer is mapped to a physical memory region that crosses one of the boundaries of one of the plurality of partitions, determining that the user buffer does not conform to the physical addressing limitations of the direct memory access controller.

5. The method of claim 1, wherein the direct memory access controller has a maximum memory address, the maximum memory address specifying a memory location in the memory area above which the direct memory access controller cannot access, and wherein the step of determining when the user buffer is mapped to a physical memory region that conforms to the physical addressing limitations of the direct memory access controller, comprises the steps of:

determining when the user buffer is mapped to a physical memory region that is located above the maximum memory address; and when the user buffer is mapped to a physical memory region that is located above the maximum memory address, determining that the user buffer does not conform to the physical addressing limitations of the direct memory access controller.

6. The method of claim 5, wherein the memory area is formed by a plurality of partitions, each partition having an upper boundary and a lower boundary, and wherein the step of determining when the user buffer is mapped to a physical memory region which conforms to the physical addressing limitations of the direct memory access controller, comprises the steps of:

determining when the user buffer is mapped to a physical memory region that crosses one of the boundaries of one of the plurality of partitions; and when the user buffer is mapped to a physical memory region that crosses one of the boundaries of one of the plurality of partitions, determining that the user buffer does not conform to the determined physical addressing limitations of the direct memory access controller.

7. The method of claim 6, further comprising the steps of:

determining when the user buffer is not mapped to a physical memory region which conforms to the physical addressing limitations of the direct memory access controller;

when the user buffer is not mapped to a physical memory region which conforms to the physical addressing limitations of the direct memory access controller, transferring the specified amount of data between the conforming buffer and the secondary storage area via the direct memory access controller;

specifying a predetermined amount of time for which the conforming buffer will remain allocated when the direct memory access controller has not transferred data between the secondary storage area and the conforming buffer;

determining when an amount of time greater than the predetermined amount of time has elapsed since the direct memory access controller has transferred data between the secondary storage area and the conforming buffer; and when an amount of time greater than the predetermined amount of time has elapsed since the direct memory access controller has transferred data between the secondary storage area and the conforming buffer, releasing the conforming buffer from the memory area to provide the computer system with an increased amount of available memory from within the memory area.

8. In a computer system having a memory area, a secondary storage area, and a direct memory access controller for transferring data between the secondary storage area and a transfer buffer contained in the memory area, an apparatus for processing a memory transfer request from an application program that specifies an amount of data and a user buffer, the user buffer being mapped to a physical memory region of the memory area and being used to hold transferred data for the application program, the apparatus comprising:

an evaluator to determine whether the user buffer is mapped to a physical memory region of said memory area which conforms to the physical addressing limitations of the direct memory access controller;

a single buffer programming device for programming the direct memory access controller to transfer the specified amount of data using the physical memory region as the transfer buffer when the physical memory region conforms to the physical addressing limitations of the direct memory access controller; and an allocator for allocating a conforming buffer in the memory area to be used as the transfer buffer when the physical memory region does not conform to the physical addressing limitations of the direct memory access controller, the conforming buffer being a buffer which conforms to the physical addressing limitations of the direct memory access controller.

9. The apparatus of claim 8, further comprising:

a timing device for determining when a predetermined amount of time has elapsed since the allocator allocated the conforming buffer; and an automatic releaser for releasing the conforming buffer from the memory area when the direct memory access controller has not transferred data between the secondary storage area and the conforming buffer for a period of time greater than the predetermined amount of time.

10. The apparatus of claim 9, wherein the evaluator further determines when the user buffer is not mapped to a physical memory region which conforms to the physical addressing limitations of the direct memory access controller, the apparatus further comprising:

a double buffering programming device to program the direct memory access controller to transfer the specified amount of data using the conforming buffer as the transfer buffer when the evaluator determines that the user buffer is not mapped to a physical memory region which conforms to the physical addressing limitations of the direct memory access controller.

11. The apparatus of claim 10 wherein the direct memory access controller accesses physical memory locations of the memory area by specifying a segment from among a plurality of segments, each segment from among the plurality of segments having an upper boundary and a lower boundary, and wherein the evaluator further comprises:

a boundary crossing determining device for determining whether the user buffer is mapped to a physical memory region that crosses one of the boundaries of one of the segments from among the plurality of segments.

12. The apparatus of claim 10, wherein the direct memory access controller has a maximum memory address, the maximum memory address specifying a memory location above which the direct memory access controller cannot transfer data, and wherein the evaluator further comprises:

a beyond maximum address determining device for determining whether the user buffer is mapped to a physical memory region that is located above the maximum memory address.

13. In a computer system having a memory area, a secondary storage, a direct memory access (DMA) controller for controlling DMA transfers between the secondary storage and the memory area, a method comprising the computer-implemented steps of:

providing an application buffer in the memory area for storing data for an application program;

determining whether the DMA controller can correctly access the application buffer to buffer data on behalf of the DMA controller;

where the DMA controller cannot correctly access the application buffer, dynamically allocating a DMA transfer buffer that the DMA controller can correctly access;

performing a DMA data transfer on behalf of the application program such that the DMA transfer buffer is used to buffer data; and deallocating the DMA transfer buffer after the DMA data transfer is complete.

14. A computer readable storage medium holding a computer code for use in a computer system that includes a memory area, a secondary storage area, and a direct memory access controller for transferring data between the secondary storage area and the memory area, said computer code, when executed, performing the steps of:

determining physical addressing limitations of the direct memory access controller;

determining when a user buffer is mapped to a physical memory region that conforms to the physical addressing limitations of the direct memory access controller;

when the user buffer is mapped to a physical memory region that conforms to the physical addressing limitations of the direct memory access controller, transferring the specified amount of data between the physical memory region and the secondary storage area via the direct memory access controller; and when the user buffer is mapped to a physical memory region of said memory area that does not conform to the physical addressing limitations of the direct memory access controller, dynamically allocating a conforming buffer in the memory area for use in transferring the specified amount of data, the conforming buffer being a buffer which conforms to the physical addressing limitations of the direct memory access controller.

15. A computer readable storage medium holding computer code for use in a computer system having a memory, a secondary storage, a direct memory access (DMA) controller for controlling DMA transfers between the secondary storage and the memory area, the computer code, when executed, performing the steps of:

providing an application buffer in the memory area for storing data for an application program;

determining whether the DMA controller can correctly access the application buffer to buffer data on behalf of the DMA controller;

where the DMA controller cannot correctly access the application buffer, dynamically allocating a DMA transfer buffer that the DMA controller can correctly access;

performing a DMA data transfer on behalf of the application program such that the DMA transfer buffer is used to buffer data; and deallocating the DMA transfer buffer after the DMA data transfer is complete.

* * * * *